United States Patent
Kakizaki et al.

[11] Patent Number: 5,548,999
[45] Date of Patent: Aug. 27, 1996

[54] MOUNTING ARRANGEMENT FOR ACCELERATION DETECTOR ELEMENT

[75] Inventors: Shinobu Kakizaki; Kimihisa Kasajima, both of Atsugi, Japan

[73] Assignee: Atsugi Unisia Corporation, Japan

[21] Appl. No.: 991,434

[22] Filed: Dec. 16, 1992

[30] Foreign Application Priority Data

Dec. 17, 1991 [JP] Japan ................................ 3-332393

[51] Int. Cl.⁶ .............................. G01P 1/02; G01P 15/02
[52] U.S. Cl. .......................................... 73/493; 73/514.12
[58] Field of Search .................... 73/493, 497, 517 R, 73/516 L, 516 R

[56] References Cited

U.S. PATENT DOCUMENTS

| | | | |
|---|---|---|---|
| 4,700,973 | 10/1987 | Gademann et al. | 73/493 |
| 4,829,822 | 5/1989 | Imai et al. | 73/516 R |
| 5,233,873 | 8/1993 | Mozgowiec et al. | 73/493 |
| 5,239,871 | 8/1993 | Reidemeister et al. | 73/497 |
| 5,335,544 | 8/1994 | Wagner et al. | 73/517 R |

FOREIGN PATENT DOCUMENTS

| | | |
|---|---|---|
| 3920645 | 1/1991 | Germany. |
| 61-187463 | 11/1986 | Japan. |
| 2033584 | 5/1980 | United Kingdom. |
| 2084330 | 4/1982 | United Kingdom. |

*Primary Examiner*—Hezron E. Williams
*Assistant Examiner*—Helen C. Kwok
*Attorney, Agent, or Firm*—Ronald P. Kananen

[57] ABSTRACT

A semiconductor type acceleration sensor comprises a flexible printed circuit board on which a semiconductor type detector chip section is mounted The detector chip is formed with openings therethrough overlapping an opening formed in a rear-side base plate of the flexible printed circuit board such that the detector chip section is supported only by a bridge portion. In case of excess input in an acceleration direction, elastic deformation of the bridge portion and a bending portion of the flexible printed circuit board provide absorption of tile excess input for protecting the detector chip section.

23 Claims, 5 Drawing Sheets

MOUNTING ARRANGEMENT FOR ACCELERATION DETECTOR ELEMENT

BACKGROUND OF THE INVENTION

1. Field of The Invention

The present invention relates generally to an acceleration sensor for automotive vehicles. Particularly, the invention relates to a semiconductor type acceleration sensor, a detector chip of which may be protected from excess input in an acceleration direction.

2. Description of The Prior Art

Semiconductor type acceleration sensors are well known in the art and have various applications in the automotive field including suspension control, air bag system control, and the like.

Referring to FIG. 8, a detector chip 55 of such semiconductor type acceleration sensors is generally manufactured by LSI techniques on a silicon substrate 51. As seen in the drawing, the detector chip 55 is formed with a heavy bob section (i.e. a pendulum section) 52 of a cantilever shape by etching processing, or the like. Also, a strain gauge section 53 comprising a piezo resistance element, for example, is formed on a root portion of the heavy bob section 52, and at the same time, a signal processing circuit 54, for example, an amplifier circuit, and so forth is assembled on the silicon substrate 51 on which tile heavy bob portion has been formed. Thereby, a detector chip 55 capable of being a principle component of an acceleration sensor may be formed with a convenient, single-chip construction.

According to the above-described construction, an electric signal output is obtained based on a variation of strain produced in tile strain gauge portion 53 when acceleration is applied to the heavy bob section 52.

Referring now to FIG. 9, such a detector chip 55 as described above, is sealed in a casing 57 filled with insulating silicone oil 56 or the like to comprise a detection unit 58 of an acceleration sensor. As seen in FIGS. 10 and 11, the detection unit 58 is mounted on a substrate 60 with processing circuits 59 and the substrate 60 is incorporated into a housing 61. A sealing agent 62 fills a rear side of the housing 61 and a connector 63 is further provided.

In the above-described construction, silicon oil 56 is provided inside the casing 57 so as to provide damping force, in a case where an excess acceleration is applied to the detector chip 55, for preventing weakening and/or deformation of a root portion of the heavy bob section 52.

The silicon oil 56 provides such damping characteristics according to its viscous resistance; however, the viscosity of the silicon oil 56 is largely varied according to temperature. Therefore detection sensitivity of the detector chip 55 is correspondingly varied and the consistency and accuracy of the acceleration sensor is degraded.

In addition, aside from the problem of viscosity variation of the silicon oil 56, the presence of a damping fluid in the casing 57 of the detection unit 58 reduces the detection sensitivity of the detector chip 55 because an absolute displacement of the heavy bob 52 is suppressed by the viscous resistance of the silicon oil 56, or other damping fluid. This requires that the sensitivity and stability, particularly of an amplifier circuit and filter circuit as well as other signal processing circuits associated with the acceleration sensor, be substantially higher. Thus the cost and complexity of the entire sensor is increased.

SUMMARY OF THE INVENTION

It is therefore a principal object of the present invention to overcome the drawbacks of the prior art.

It is a further object of the present invention to provide a semiconductor type acceleration sensor in which a detector chip thereof is suitably protected from excess input and damping of movement wherein a movable portion of the detector chip is effected in a consistent non-temperature dependent manner without the use of damping fluid.

In order to accomplish the aforementioned and other objects, an acceleration sensor is provided, comprising: an enclosed housing portion; semiconductor type acceleration detecting means, the acceleration detecting means being formed on a silicon substrate and including thereon a substantially heavy bob section on at least one end thereof supported so as to be displacable in at least one direction according to an input acceleration, the acceleration detecting means outputting a signal representative of a degree of displacement of a the bob section, the acceleration detection means being mounted in the enclosed housing portion; signal processing means for processing an output from the acceleration detecting means; elastic support means elastically supporting at least the acceleration detecting means in an acceleration acting direction such that deformation of the elastic support means is detected in relation to the enclosed housing under a given degree of acceleration.

In addition, according to another aspect of the present invention, an acceleration sensor is provided comprising: a casing; upper and lower plates arranged one above the other within the casing, the upper plate including an opening formed therethrough; a flexible substrate arranged inside the casing such that portions of the flexible substrate are adhered to upper surfaces of both the upper plate and the lower plate and so as to cover the opening in the upper plate; acceleration detection means mounted on the flexible substrate upper plate, at a position over the opening in the upper plate the acceleration detection means outputting a signal indicative of a degree of detected acceleration; signal processing means mounted on the flexible substrate and associated with the acceleration detection means; terminal portions attached to the flexible substrate and connected to the acceleration detection means and the signal processing means with a connector portion located outside of the casing; and sealing means enclosing the flexible substrate, the signal processing means, the detection means, the upper and lower plates and the terminal portions within the casing.

According to a further aspect of the invention, an alternative embodiment of an acceleration sensor is provided, comprising: a housing; a rigid substrate mounted within the housing; acceleration detection means mounted on the rigid substrate; signal processing means further mounted on the rigid substrate and outputting a signal representative of a degree of acceleration detected by the acceleration detection means; mounting spacers provided at each corner of the rigid substrate and formed of an elastic material, the mounting spacers elastically supporting at least the acceleration detecting means in an acceleration acting direction such that the mounting spacers are subject to elastic deformation in relation to the enclosed housing under a given degree of acceleration; connection means allowing at least the signal processing means to be connected to external apparatus; and a bottom portion enclosing the rigid substrate, the acceleration detection means, the signal processing means, and the mounting spacers within the housing.

According to yet another aspect of the present invention, a method of assembling an acceleration sensor is provided, comprising the steps of: a) forming an elongate flexible substrate; b) mounting an acceleration detection means on the flexible substrate; c) mounting signal processing means on the flexible substrate; d) mounting connecting terminals to the flexible substrate; e) adhering opposing portions of the flexible substrate respective plates, one of the plates having an opening defined therethrough, a portion of the flexible substrate mounting the acceleration detection means being positioned over the opening formed in the one of the plates; f) folding the flexible substrate along a central folding portion; g) inserting the plates and the folded flexible substrate into a casing having an open bottom portion such that the one plate is inserted topmost and the acceleration detecting means mounted on the flexible substrate is facing in an acceleration direction, the shape of the plates conforming to the circumferential shape of the casing and the other plate being inset at the bottom of the open portion of the casing; h) installing connecting means connecting the acceleration detecting means with an output external to the casing; and i) sealing the casing via a sealing agent.

Finally, according to the invention, another method of assembling an acceleration sensor is provided, comprising the steps of: a) mounting acceleration detection means on a rigid substrate; b) mounting signal processing means on the rigid substrate; c) providing mounting spacers formed of an elastic material at each corner of the rigid substrate, such that the mounting spacers elastically supporting at least the acceleration detecting means in an acceleration acting direction; d) installing connection means allowing at least the signal processing means to be connected to external apparatus; and e) attaching a bottom portion so as to enclose the rigid substrate, the acceleration detection means, the signal processing means, and the mounting spacers within the housing.

DESCRIPTION OF THE PREFERRED EMBODIMENT

Figure 1:
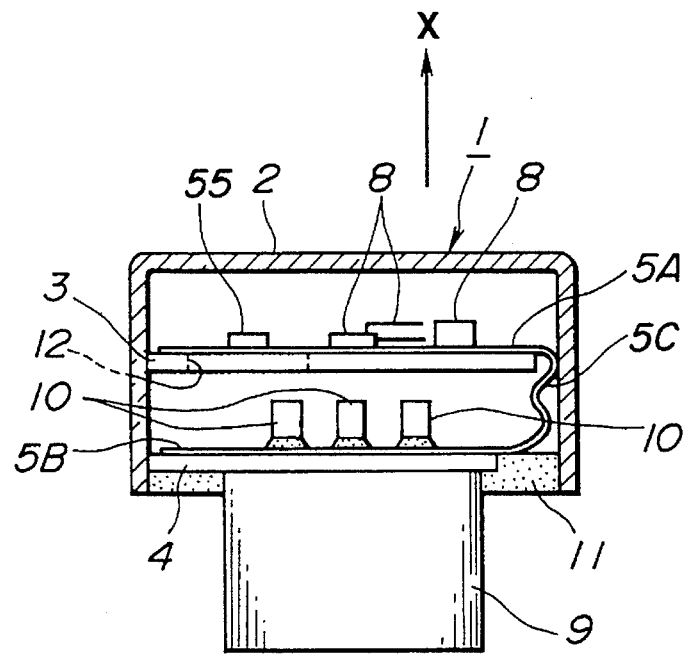
FIG. 1 shows a cross-sectional view of a first embodiment of an acceleration sensor according to the invention.
Figure 4:
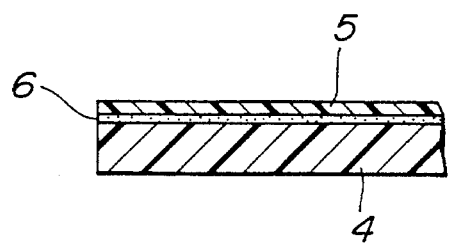
FIG. 4 is a cross-sectional view taken along line a—a of FIG. 3.

Referring now to the drawings, particularly to FIG. 1, an acceleration sensor according to the invention is shown. As seen in the drawing, the sensor 1 comprises a rectangular casing 2 containing therein an upper plate 3 and a lower plate 4 made of synthetic resin, for example, and arranged one above the other. A flexible printed circuit substrate 5 is arranged inside the casing 2 such that portions of the flexible printed circuit substrate 5 are adhered to upper surfaces of both the upper plate 3 and the lower plate 4 via a bonding agent 6, as shown in FIG. 4. On the upper surface of the upper portion 5A of the flexible printed circuit substrate 5, a detector chip 55 and associated signal processing circuits 8, 8 are mounted while, on the upper surface of the lower portion 5B of the flexible printed circuit substrate 5, terminal portions 10 of a connector 9 are attached by soldering, or the like. The upper portion 5A of the flexible printed circuit is joined to the lower portion 5B through an elongated folded central portion 5C. Further, the under the lower plate 4, the base portion of the casing 2 is entirely closed by a sealing agent 11; thus, the components of the acceleration detector 1 are completely enclosed within the casing 2.

The structure of the detector chip is well known and has been described above with reference to FIG. 7; therefore such description will be omitted for brevity. When referring to the components of the detector chip 55 the same reference numerals will be cited for clarity of description.

Figure 2:
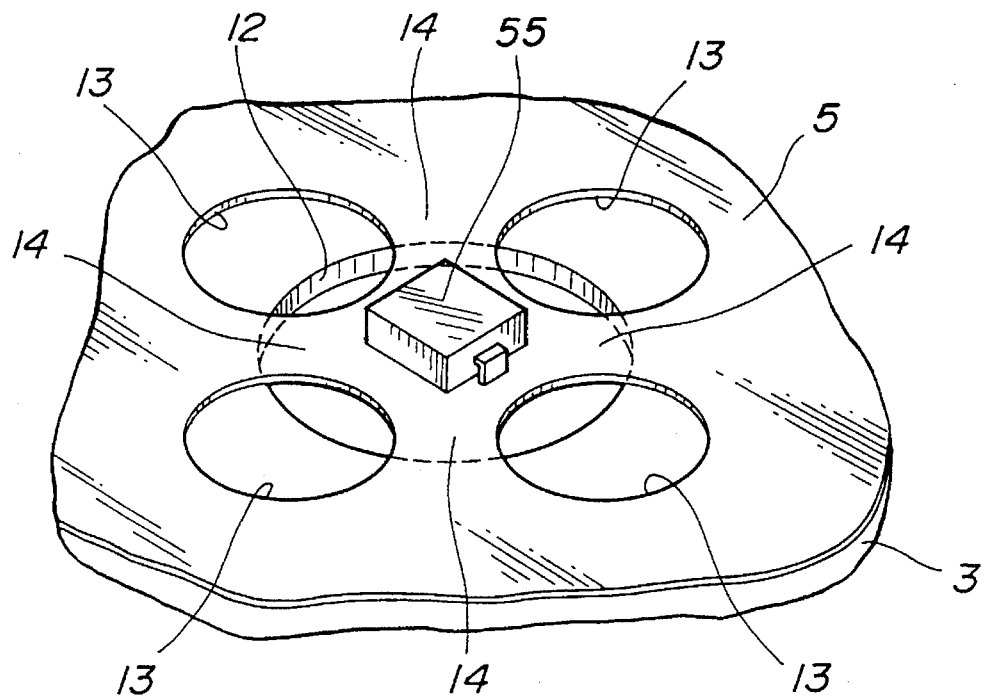
FIG. 2 shows an enlarged perspective view of the main features of FIG. 1.

Referring to FIG. 2, the detector chip 55, a circular hole 12, wider in area than the detector chip 55 is formed through the upper plate 3 under the position of the detector chip 55. Thus, in the area of the detector chip 55, the chip is supported only by the flexible printed circuit substrate 5 with no underlying plate. In addition, a plurality of smaller circular holes 13 are formed through the flexible printed circuit substrate 5 so as to surround the detector chip 55. The smaller holes 13 are formed such that a portion of their area overlaps a portion of the large hole 12 formed in the upper plate 3. Thus, the detector chip 55 is suspended on an elastic bridge portion 14 which defined by the smaller holes 13 and the portions of the flexible printed circuit substrate 5 which overhangs the large circular hole 12. Thus an acceleration buffering construction is created wherein excess acceleration input to the detector chip is absorbed by deformation of the elastic bridge portion 14.

According to the above embodiment a plurality of holes (i.e. four) are provided. However, the advantageous effects of the invention may be realized by providing only the large hole 12 covered by the flexible printed circuit substrate 5 only, for mounting the detector chip 55 thereon. The number and size of the surrounding smaller holes 13 may be determined according to a degree of elastic deformability to be provided for the bridge portion 14. A greater degree of elasticity providing a higher buffering effect for the detector chip 55.

Hereinbelow, an assembly procedure for an acceleration sensor according to the invention will be described in detail with reference to FIGS. 3 and 4.

Figure 3:
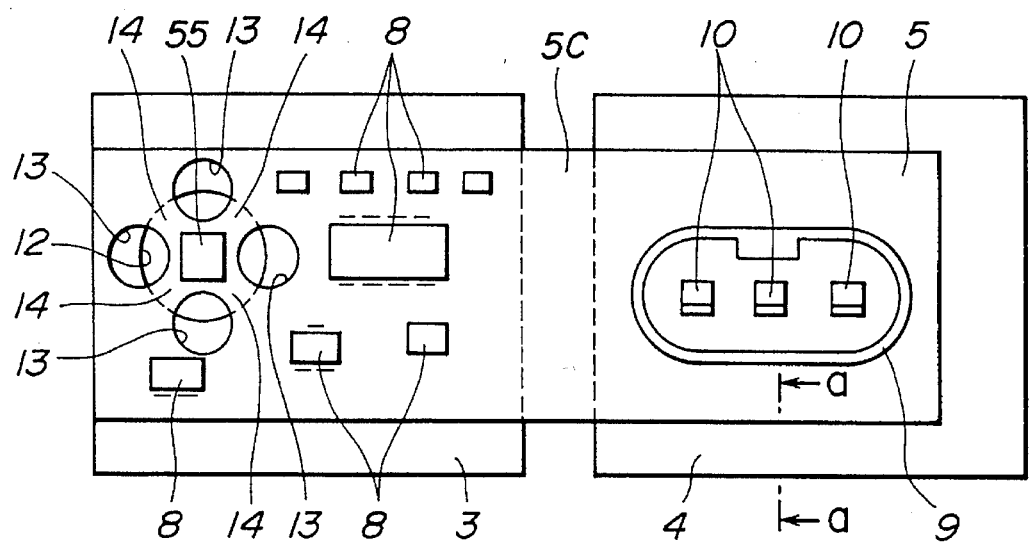
FIG. 3 is a plan view of a printed circuit board utilized in the acceleration sensor of the invention.

First, referring to FIG. 3, the elongated flexible printed circuit substrate 5 is formed and provided with the necessary components such as the detector chip 55, the signal processing circuits 8, 8, the small holes 13, and the terminals 10 of the connector 9 in advance. Next, respective portions 5A and 5B of the flexible printed circuit substrate 5 are adhered to the upper and lower plates 3 and 4 via the bonding agent 6, as best seen in FIG. 4.

After the flexible printed circuit substrate 5 affixed to the plates 3 and 4, the flexible printed circuit substrate 5 is folded along an elongate central folded portion 5C and inserted into the casing 2 through the open bottom portion such that the plate 3 is inserted topmost, the shape of the plate 3 conforming to the circumferential shape of the casing 2, and the plate 4 is inset at the bottom of the open portion of the casing 2 after which it is sealed therein by the sealing agent 11. It will be noted from FIG. 1 and from the above description that the folded portion 5C, for which a small space is allowed on one side of the plate 3, further acts as an elastic support for the upper plate and thus provides additional buffering against excess acceleration input.

Thus, according to the above described structure, in a state where the acceleration sensor 1 is installed in a vehicle, for example, if an excess input in the acceleration detecting direction is applied, the folded portion 5C is deformed to provide a buffering effect essentially for the entire upper plate 3. However, since the essential element of the acceleration sensor 1, that is, the detector chip 55, is mounted on the bridge portion 14 over the hole 12 of the upper plate 3, the bridge portion 14 is similarly elastically deformed in the acceleration input direction to absorb an excess acceleration force applied to the detector chip and thus prevent deformation or damage at the root of the heavy bob portion 52 of the detector chip 55.

Hereinbelow, a second embodiment of the invention will be described in detail with reference to FIGS. 5–7.

Figure 5:
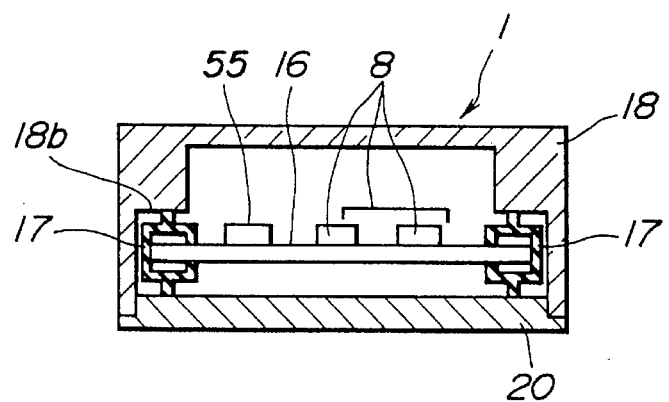
FIG. 5 is a cross-sectional view of a second embodiment of an acceleration sensor according to the invention.

According to this embodiment, as best seen in FIG. 5, the detector chip 55, the signal processing circuits 8, 8, and the like, are mounted on a conventional, hard type printed circuit board 16 which is then elastically supported in a housing 18 via a mount spacer 17 formed of an elastic material such as rubber, or the like.

Figure 6:
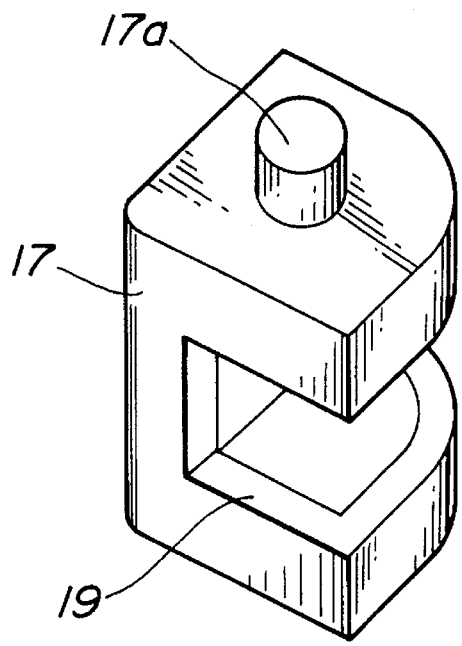
FIG. 6 is an enlarged perspective view of a mount spacer utilized in the acceleration sensor of FIG. 5.
Figure 7:
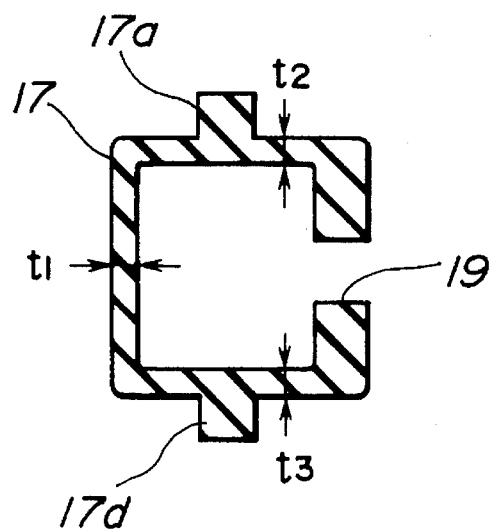
FIG. 7 is a vertical cross-sectional view of the mount spacer of FIG. 6.
Figure 8:
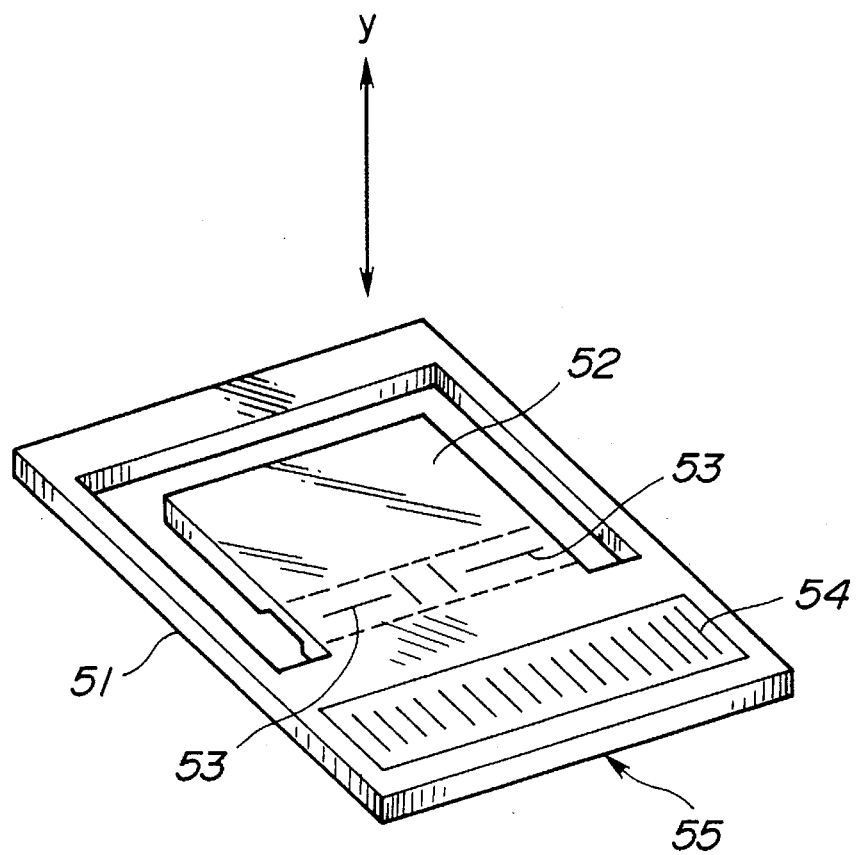
FIG. 8 is an enlarged perspective view of the essentials of a conventional detector chip section of a semiconductor type acceleration sensor.
Figure 9:
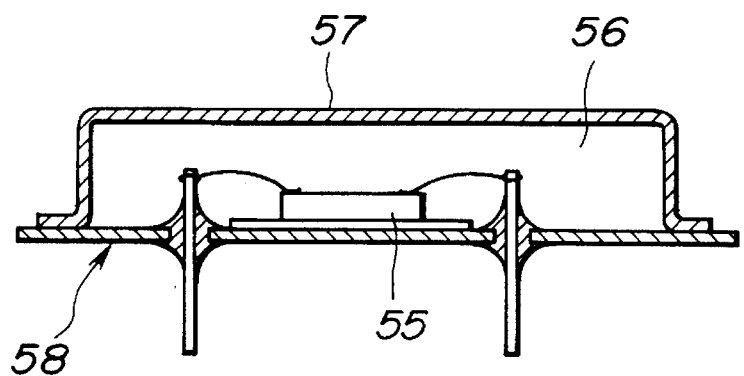
FIG. 9 is a cross-sectional view of a conventional detection unit for detecting acceleration formed using the detector chip of FIG. 8 as a central component.
Figure 10:
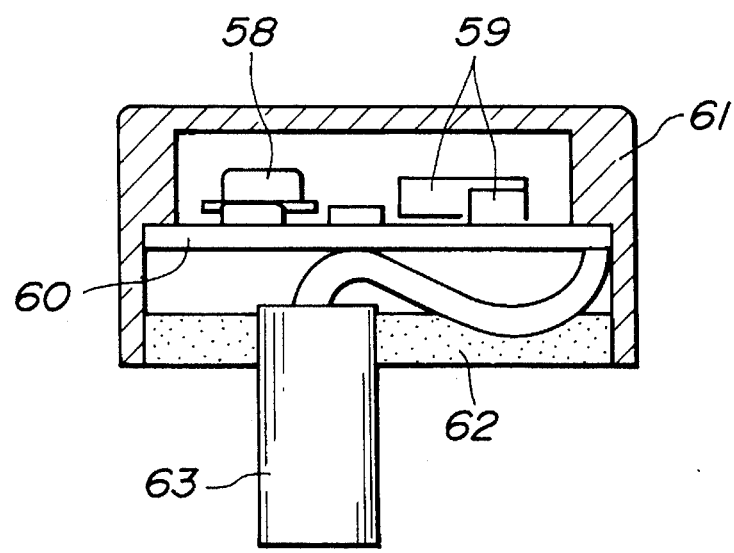
FIG. 10 is a cross-sectional view of a conventional acceleration sensor including the detector unit of FIG. 9.
Figure 11:
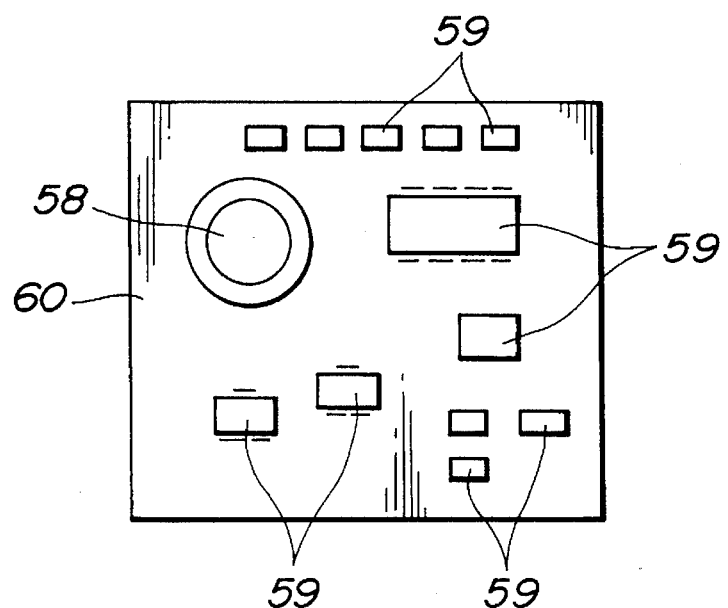
FIG. 11 is a plan view of a printed circuit board utilized in the conventional acceleration sensor of FIG. 10.

More specifically, referring to FIGS. 6 and 7, the mount spacer 17 has a hollow configuration with an engaging notch 19. Mount spacers 17 are provided at all four corners of the printed circuit board 16 and installed therewith into a rectangular shaped casing 18 such that the printed circuit board 16 is supported by the mount spacers 17, upper and lower positioning nodes 17a of the mount spacers 17 respectively contacting a stepped surface 18b of the housing 18 and the upper surface of a bottom portion 20 which closes the bottom of the housing 18 after the printed circuit board 16 and mount spacers 17 have been installed.

According to the above-described construction, the mount spacer of the second embodiment provides a buffering effect in supporting the detector chip of the acceleration sensor 1 in the same way as the elastic bridge of the first embodiment. In addition, the mount spacer of the second embodiment provides elastic support for the components of the acceleration sensor 1 not only in the direction of input acceleration, but also in transverse or orthogonal directions. Also, it will be noted, with reference to FIG. 7 that, by suitable selection of the widths t1, t2, and t3 of the mount spacer 17, and selection of appropriately hard or resilient materials for making the mount spacer 17, various elastic and resilient properties are available which may be utilized for providing optimum characteristics for the intended application of the acceleration sensor 1.

The present invention may be also be applied to a capacitance type acceleration sensor for determining acceleration by detecting variation of capacitance of a capacitor due to displacement of a heavy bob arranged at one side pole of the capacitor.

Thus, according to the present invention as herein described, a chip may be elastically mounted to suitable protect the chip from damage and/or deformation due to an excess input of an acceleration force in an input direction. Further, detecting accuracy is improved since a damping fluid such as silicon oil is not required. In addition, variation of detection accuracy due to an ambient temperature is avoided.

It will also be noted that, since displacement of the heavy bob portion of the detector chip is not suppressed due to the presence of a damping fluid, it is unnecessary to use signal processing circuits of inordinately high sensitivity. Nor are hermetic sealing techniques for retaining fluid required for manufacturing the sensor of the invention. Thus reduction of costs for the acceleration sensor as a whole can be realized.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An acceleration sensor comprising:

an enclosed housing portion;

semiconductor type acceleration detecting means formed on a silicon substrate and mounted in said enclosed housing portion, and including, at an end portion of said acceleration detecting means, a mass displacable in at least an acceleration acting direction, said acceleration detecting means active to output an acceleration signal proportional to a degree of displacement of said mass;

signal processing means for processing said signal output from said acceleration detecting means; and elastic support means active to elastically support at least said acceleration detecting means in said acceleration acting direction and applying a predetermined degree of damping force to a displacement of said acceleration detecting means in relation to said enclosed housing portion under a given degree of acceleration.

2. An acceleration sensor comprising;

a casing;

an upper and a lower plate arranged one above the other within said casing, said upper plate including an opening formed therethrough;

a flexible substrate arranged inside the casing such that first and second portions of the flexible substrate are respectively adhered to surfaces of said upper plate and said lower plate so as to cover said opening in said upper plate;

acceleration detection means mounted on said flexible substrate at a position over said opening in said upper plate, said acceleration detection means being active to output a signal proportional to a degree of acceleration applied to said sensor;

signal processing means mounted on said flexible substrate for receiving said signal output from said acceleration detection means;

terminal portions connected to said signal processing means and including a connector portion located outside of said casing; and sealing means active to sealingly enclose said flexible substrate, said signal processing means, said acceleration detection means, said upper and lower plates, and said terminal portions within said casing.

3. An acceleration sensor as set forth in claim 2, wherein said upper and lower plates are formed of synthetic resin.

4. An acceleration sensor as set forth in claim 2, wherein an opening is formed through the flexible substrate proximate said acceleration detection means such that a portion of the area thereof overlaps a portion of the opening formed in the upper plate such that said acceleration detection means is suspended on an elastic bridge portion defined by portions of the flexible substrate overhanging said opening in said upper plate.

5. An acceleration sensor as set forth in claim 2, wherein a plurality of holes are provided in said flexible substrate so as to surround said acceleration detection means, said holes partially overlapping said opening in said upper plate and defining an elastic bridge portion over said opening in said upper plate.

6. An acceleration sensor as set forth in claim 5, wherein a number and size of said holes is determined according to a degree of elastic deformability to be provided to said elastic bridge portion to adjust a resiliency of an area of said elastic bridge portion mounting said acceleration detection means.

7. An acceleration sensor as set forth in claim 2, wherein said opening in said upper plate is circular, said acceleration detection means mounted on said flexible substrate being positioned substantially over a center of said opening.

8. An acceleration sensor as set forth in claim 5, wherein said plurality of holes surrounding said acceleration detection means are circular and smaller than said opening formed in said upper plate, said plurality of openings being arranged symmetrically around said acceleration detection means.

9. An acceleration sensor as set forth in claim 2, wherein said acceleration detection means comprises a semiconductor type acceleration sensor formed on a silicon substrate, said semiconductor type acceleration sensor including:
- a mass formed on a cantilever such that said mass is displacable in at least an acceleration acting direction,
- a strain gauge responsive to movement of said mass and comprising a piezo resistance element, and
- a signal processing circuit assembled on the silicon substrate.

10. An acceleration sensor as set forth in claim 2, wherein said signal processing means includes at least an amplifier circuit and a filter circuit.

11. An acceleration sensor as set forth in claim 2, wherein said acceleration detection means is a capacitance type acceleration sensor for detecting variation of capacitance of a capacitor due to displacement of a mass arranged at one side of the capacitor.

12. An acceleration sensor as set forth in claim 2, wherein a folded section of said flexible substrate extending between said upper and lower plates resiliently supports said upper plate in relation to said casing.

13. An acceleration sensor, comprising
an enclosed housing;
an acceleration detector disposed in said enclosed housing and generating an output proportional to deflection of a mass portion thereof;
connection means for enabling said sensor to be connected to external apparatus;
signal processing means for receiving said output of said acceleration detector and outputting an acceleration signal based thereon to said connection means for indicating a present acceleration; and
damping means, formed of an elastic compound, active to mount said acceleration detector on a substrate within said enclosed housing in a manner so as to elastically support said acceleration detector in at least an acceleration acting direction, said damping means being constructed such that a predetermined degree of elastic deformation thereof is present under a given degree of acceleration.

14. An acceleration sensor as set forth in claim 13, wherein said acceleration detector mounted on said substrate is a semiconductor device and said substrate is formed of a flexible material;
said signal processing means is provided on first and second portions of said flexible substrate which are respectively adhered over first and second parallel mounting surfaces, said first mounting surface being arranged above said second mounting surface within said enclosed housing, one of said first and second mounting surface having an opening provided therethrough;
wherein said acceleration detector is mounted on said flexible substrate at a position over said opening.

15. An acceleration sensor as set forth in claim 14, wherein said first and second mounting surfaces are formed of synthetic resin.

16. An acceleration sensor as set forth in claim 14, wherein a degree of damping force applied to the acceleration detector is modified by provision of one or more adjustment openings formed through the flexible substrate proximate said acceleration detector such that a portion of each of said adjustment openings overlaps a portion of said opening.

17. An acceleration sensor as set forth in claim 14, wherein said opening is circular and said acceleration detector is positioned substantially over a center thereof.

18. An acceleration sensor as set forth in claim 17, wherein a plurality of circular adjustment openings are provided, said adjustment openings being formed smaller than said opening and proximate said acceleration detector, said plurality of adjustment openings being arranged symmetrically around said acceleration detector.

19. An acceleration sensor as set forth in claim 13, wherein said acceleration detector comprises a semiconductor type acceleration detecting element formed on a silicon substrate, said semiconductor type acceleration sensor including a mass and a strain gauge portion comprising a piezo resistance element formed at a base of said mass.

20. An acceleration sensor as set forth in claim 13, wherein said signal processing means includes at least an amplifier circuit and a filter circuit.

21. An acceleration sensor as set forth in claim 13, wherein said acceleration detector is a capacitance type acceleration sensor for detecting variation of capacitance of a capacitor thereof according to said deflection of a mass portion arranged at one pole of said capacitor.

22. An acceleration sensor as set forth in claim 14, wherein said opening is provided in said first mounting surface, which is mounted vertically above said second mounting surface.

23. An acceleration sensor as set forth in claim 22, wherein a third portion of said flexible substrate is disposed between said first and second portions in a manner so as to provide damping force resisting movement of said first portion of said substrate in the direction of said second portion thereof, and vice versa.

* * * * *